(12) United States Patent
Han et al.

(10) Patent No.: US 6,665,669 B2
(45) Date of Patent: Dec. 16, 2003

(54) METHODS AND SYSTEM FOR MINING FREQUENT PATTERNS (75) Inventors: Jiawei Han, Burnaby (CA); Jian Pei, Burnaby (CA); Yiwen Yin, Burnaby (CA); Runying Mao, Burnaby (CA)

(73) Assignee: DB Miner Technology Inc., Coquitlam (CA)

( * ) Notice: Subject to any disclaimer, the term of this patent is extended or adjusted under 35 U.S.C. 154(b) by 349 days.

(21) Appl. No.: 09/746,012

(22) Filed: Dec. 26, 2000

(65) Prior Publication Data

US 2003/0028531 A1 Feb. 6, 2003

Related U.S. Application Data (60) Provisional application No. 60/174,166, filed on Jan. 3, 2000.

(51) Int. Cl.[7] .............................................. G06F 17/30
(52) U.S. Cl. ................................... 707/6; 707/102
(58) Field of Search ........................... 707/6, 101, 2–5, 707/102

(56) References Cited

U.S. PATENT DOCUMENTS

| 5,418,947 | A | * | 5/1995 | Hsu et al. ........................ 707/1 |
| 5,742,811 | A | * | 4/1998 | Agrawal et al. ................. 707/6 |
| 6,169,986 | B1 | * | 1/2001 | Bowman et al. ................ 707/2 |
| 6,311,179 | B1 | * | 10/2001 | Agarwal et al. ................ 707/6 |
| 6,330,556 | B1 | * | 12/2001 | Chilimbi et al. ............... 707/2 |
| 6,389,416 | B1 | * | 5/2002 | Agarwal et al. ................ 707/3 |

* cited by examiner

Primary Examiner—Safet Metjahic
Assistant Examiner—Haythim J. Alaubaidi
(74) Attorney, Agent, or Firm—Oyen Wiggs Green & Mutala (57) ABSTRACT

This invention provides methods apparatus and data structures useful for mining databases for frequent items. The invention uses a frequent pattern tree to represent the contents of a database in a manner which is conducive to data mining. The frequent pattern tree tends to be smaller than the original database. A frequent pattern tree can be mined recursively. The frequent pattern tree and associated methods and apparatus of this invention is relatively fast, efficient and scalable and can be used to mine both long and short frequent patterns.

34 Claims, 10 Drawing Sheets

FIRST RECORD = {f, a, c, d, g, i, m, p}

METHODS AND SYSTEM FOR MINING FREQUENT PATTERNS

REFERENCE TO RELATED APPLICATIONS

This application claims priority from U.S. application No. 60/174,166 filed on Jan. 3, 2000 and entitled MINING FREQUENT PATTERNS WITHOUT CANDIDATE GENERATION: AN FP-TREE BASED FREQUENT PATTERN GROWTH METHOD which is hereby incorporated by reference.

TECHNICAL FIELD

This invention relates to data processing and, in particular to a method and system for mining frequent patterns from databases. The invention has application in many fields including business decision making, marketing, customer relation management, medical and biological research, and the like. The field in which this invention falls is variously described as "frequent pattern mining", "association mining", and "frequent sets mining".

BACKGROUND

Finding frequent patterns in databases gaining importance as a way to obtain valuable business information. For example, a merchant who maintains a database containing records of transactions might be interested in determining any patterns in the purchasing habits of the merchant's customers. For example, the merchant may wonder answer questions such as "what pairs of items are typically purchased by consumers at the same time?". A scientist studying a genome may have a database containing records of gene sequences and may wish to know whether certain sequences tend to occur together in the same stretch of DNA. A researcher studying responses given in a census, survey or consumer questionnaire may wish to identify patterns in the responses. Data mining methods can be applied to these problems and to detecting other types of correlation. Data mining is the field of deriving information about patterns expressed in large collections of information.

Various data mining methods are known. For example, Agrawal et al., U.S. Pat. No. 5,794,209 describes a method for discovering consumer purchasing tendencies. The method is implemented in a computer program which identifies consumer transaction itemsets that are stored in a database and which appear in the database a user-defined minimum number of times.

Agrawal's method belongs to a class of data mining methods called apriori methods. Apriori methods for identifying frequent patterns begin by scanning a database of itemsets, each comprising a number of items and identifying frequent items. The methods then generate candidates for frequent patterns by taking the frequent items taken together in all possible pairs. The database is then scanned to determine the frequency of each candidate pair. Once frequent pairs have been identified then candidates for frequent itemsets each with three items can be generated by taking each frequent pair together with another frequent item. The methods then scan the database to determine which of the candidates for frequent triplets actually occur frequently. The methods can proceed iteratively to identify frequent patterns of any length.

Apriori methods take advantage of the idea that any subset of a frequent itemset must itself be frequent. No frequent itemset can include any items which are not themselves frequent in the database. Apriori-like methods use this idea to prune candidate sets. This dramatically reduces the number of candidate sets that must be checked for frequency. In essence, apriori methods use a known collection of itemsets which are frequent and have (k−1) items to generate candidates for frequent itemsets having k items. Database scanning and pattern matching is used to collect counts for the candidate itemsets.

Apriori-like methods all have the significant disadvantage that they are much slower to execute than is desirable. The time expended by such methods is largely occupied by scanning the database. The candidate sets can be extremely large. For example, in a case where a database contains $10^4$ frequent items, an apriori-like method will generate roughly $10^7$ candidate itemsets of length 2. The number of candidate itemsets becomes unmanageable in cases where long patterns are being searched for. For example, to discover a frequent pattern of size 100, one needs to generate $2^{100} \approx 10^{30}$ candidates. A large database may contain many gigabytes of data. Even scanning a large set of candidates against a large database takes a significant amount of time even with modern computer hardware running optimized software. Finding long frequent patterns in large databases with apriori-like methods is impractical.

Various techniques have been used to prune candidate sets to make it practical to search for long frequent patterns in databases. However, such techniques are still slow, especially in cases with large databases in which there is a reasonably large number of both long and short frequent patterns.

There is a need for methods and systems for quickly identifying frequent patterns in large databases.

SUMMARY OF THE INVENTION

This invention provides methods and apparatus for mining frequent patterns from databases. The invention has particular application when applied to large databases.

One aspect of the invention provides a method for identifying patterns from a database of records. Each record has a plurality of items. The method comprises constructing an FP-tree for the database; and, mining the FP-tree to obtain frequent patterns. In preferred embodiments of the invention, constructing the FP-tree comprises: scanning the database to obtain an ordered list of frequent items in the database; and, then, for each record in the database: creating a list of any frequent items occurring in that record in the same order as the frequent items occur in the ordered list; setting a root node of the FP-tree as a current node; and, for each item in the list of any frequent items, determining whether there is a node directly linked to the current node which corresponds to the item. If there is a node directly linked to the current node which corresponds to the item incrementing a counter for the node and setting the node as the current node. Otherwise the method creates a node corresponding to the item and linked to the current node and sets the created node as the current node. Preferably the frequent items in the ordered list are ordered in order of their frequency in the database.

The FP-tree preferably comprises a header data structure which includes a record for each of the frequent items in the database.

Mining the FP-tree to obtain frequent patterns preferably comprises: for each frequent item constructing a conditional pattern-base, and constructing a conditional FP-tree from the conditional pattern-base; recursively constructing a conditional pattern-base, and constructing a conditional FP-tree from the conditional pattern-base on each newly created conditional FP-tree until the resulting FP-tree is empty; and, after creating each FP-tree, collecting frequent itemsets from the FP-tree. Preferably the method includes determining whether a conditional FP-tree contains only one path and, of so, generating all combinations of sub-paths of the FP-tree and recording each sub-paths as a frequent pattern.

The invention also provides a method for constructing an FP-tree corresponding to a database and containing information useful for identifying frequent patterns in the database. The method comprises scanning the database to obtain an ordered list of frequent items in the database. Then, for each record in the database, the method: creates a list of any frequent items occurring in that record in the same order as the frequent items occur in the ordered list; sets a root node of the FP-tree as a current node; and, for each item in the list of any frequent items, determines whether there is a node directly linked to the current node which corresponds to the item. If so, the method increments a counter for the node and sets the node as the current node. If not, the method creates a node corresponding to the item and linked to the current node and sets the created node as the current node.

Another aspect of the invention provides a method for identifying patterns from a database of records. Each record has a plurality of items. The method comprises providing an FP-tree corresponding to the database and mining the FP-tree to obtain frequent patterns. Mining the FP-tree comprises, for each frequent item constructing a conditional pattern-base, and constructing a conditional FP-tree from the conditional pattern-base; recursively constructing a conditional pattern-base, and constructing a conditional FP-tree from the conditional pattern-base on each newly created conditional FP-tree until the resulting FP-tree is empty; and, after creating each FP-tree, collecting frequent itemsets from the FP-tree.

Another aspect of the invention provides a FP-tree data structure for use in mining frequent patterns from a database. The database contains a plurality of records. The FP-tree data structure comprises a root, a plurality of nodes linked to the root, each node associated with a frequent item from the database, the nodes linked to form a plurality of paths, the paths each corresponding to an itemset in a record of the database. Preferably the FP-tree data structure comprises a header structure. The header structure comprising an ordered list of frequent items in the database and a pointer to a node in the data structure associated with each of the frequent items.

A further aspect of the invention comprises an FP-tree data structure for use in mining frequent patterns from a database containing a plurality of records. The FP-tree data structure is resident in a storage device accessible to a computer and comprises a plurality of linked nodes and a header structure. The header structure comprises an ordered list of frequent items from a database and a pointer to at least one node associated with each of the frequent items. Each of the linked nodes is associated with one of the frequent items of the header structure. The nodes are linked to form a plurality of paths. The nodes on each of the paths correspond to frequent items present in a record of the database. Nodes associated with a selected one of the frequent items of the header structure are accessible by traversing the nodes beginning at the pointer in the header structure corresponding to the selected one of the frequent items. Preferably each of the nodes comprises a pointer capable of identifying another one of the nodes associated with the same one of the frequent items and traversing the nodes comprises sequentially following the pointers in the nodes discovered by beginning at the pointer in the header structure corresponding to the selected one of the frequent items.

A further aspect of the invention provides apparatus for mining frequent patterns from information in a database comprising a plurality of records. The apparatus comprises: a computer processor; a database having records accessible to the computer processor; a program store accessible to the computer processor; a data store accessible to the computer processor; and software instructions recorded in the program store. The software instructions are executable by the computer processor. The software instructions, when executed, cause the computer processor to: scan the database to obtain a list of frequent items in the database; create an ordered list of the frequent items ordered in order of frequency in the database; and, based on the ordered list of the frequent items and information in the database, create an FP-tree data structure corresponding to the database in the data store.

Still further aspects of the invention provide a program product comprising a medium carrying a set of computer-readable signals containing computer-executable instructions which, when run by a computer, cause the computer to execute a method of the invention.

Further features and advantages of the invention are described below.

BRIEF DESCRIPTION OF DRAWINGS

In figures which illustrate non-limiting embodiments of the invention:

FIG. 2 illustrates a basic method according to the invention;

DESCRIPTION

Figure 1:
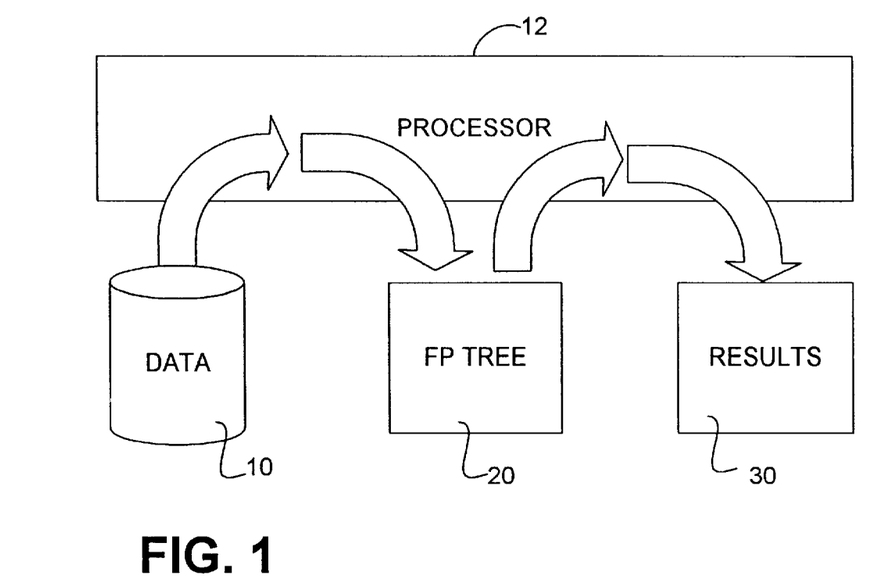
FIG. 1 is a simplified block diagram of a system in which methods for mining long patterns according to this invention may be practised.

As shown in FIG. 1, instead of scanning an existing database 10 using an apriori or other method to search for frequent patterns, the methods of this invention build a frequent pattern tree ("FP-tree") data structure 20 that corresponds to database 10 and is well adapted for searching for frequent patterns. Once an FP-tree data structure 20 has been built, frequent patterns in the corresponding database 10 can be identified extremely quickly by searching in FP-tree 20.

Consider as an example a database 10 containing the records illustrated in Table I. The list of items referred to in the right hand column of each record in Table I might represent, for example, a list of items purchased in a transaction.

TABLE I

Example Database

| Transaction No. | Items |
|---|---|
| 001 | f, a, c, d, g, i, m, p |
| 002 | a, b, c, f, l, m, o |
| 003 | b, f, h, j, o |
| 004 | b, c, k, s, p |
| 005 | a, f, c, e, l, p, m, n |

Figures 2, 8:
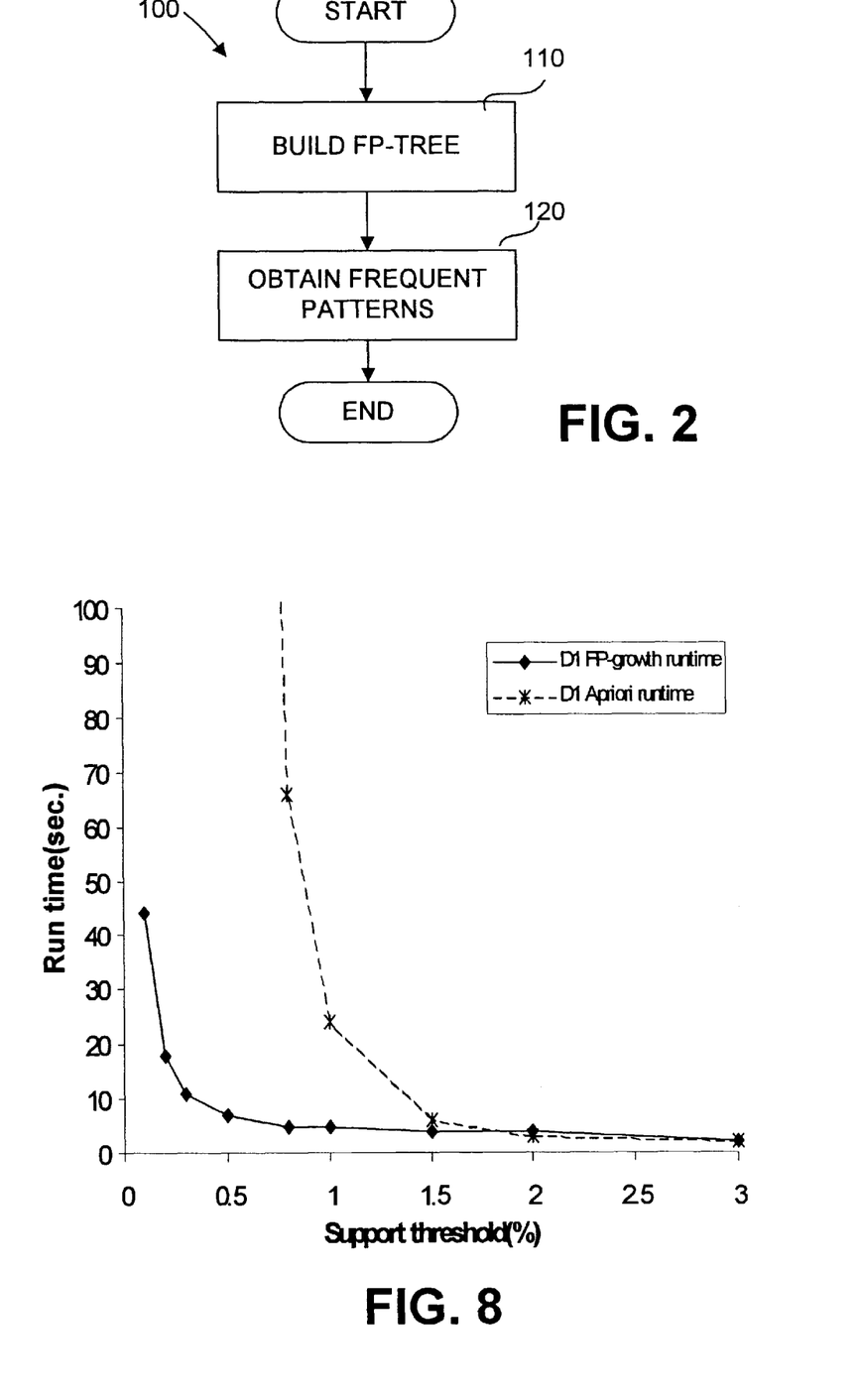
Figure 3A:
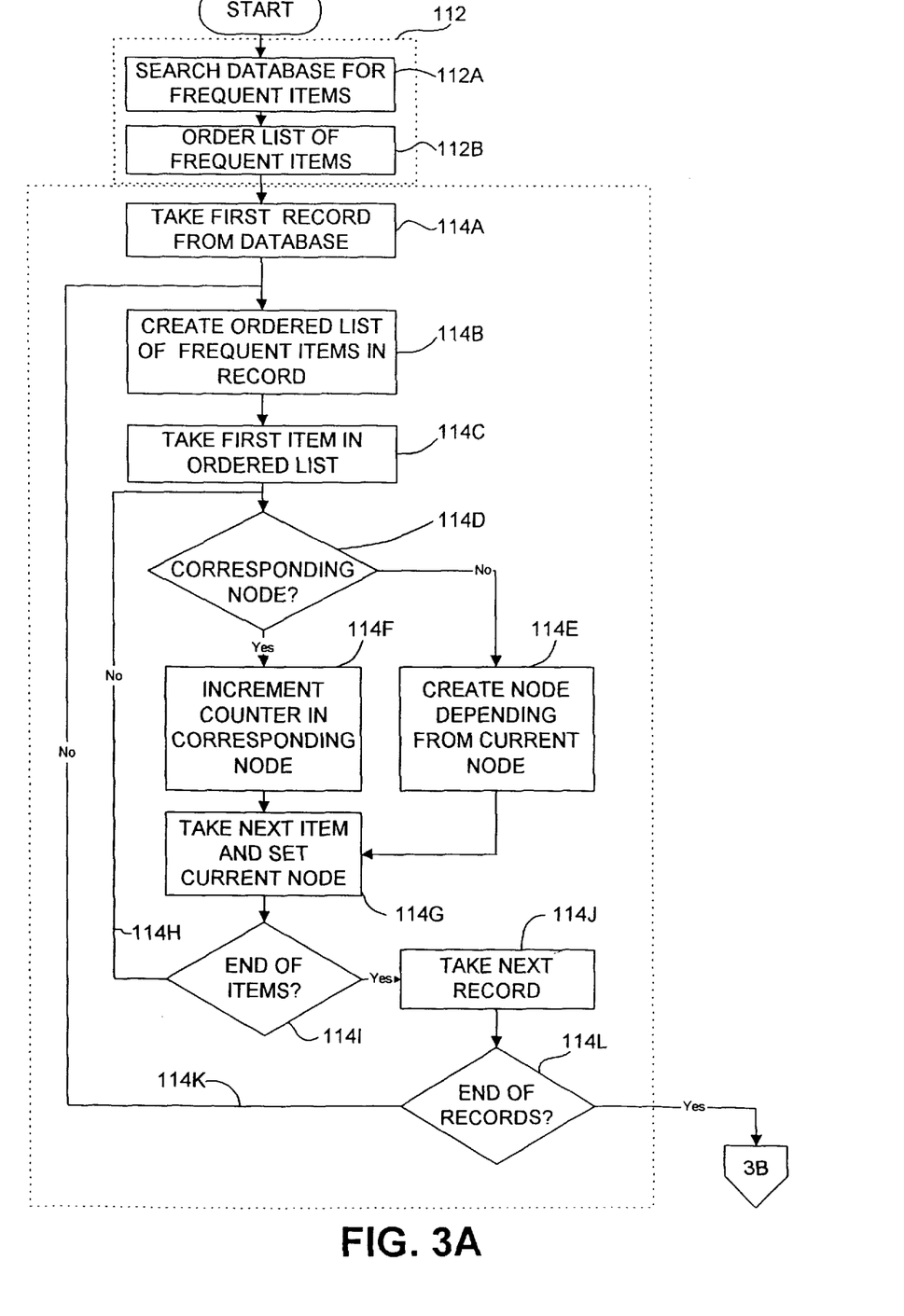
FIGS. 3A and 3B are flow charts illustrating a method according to the invention in more detail.
Figure 3B:
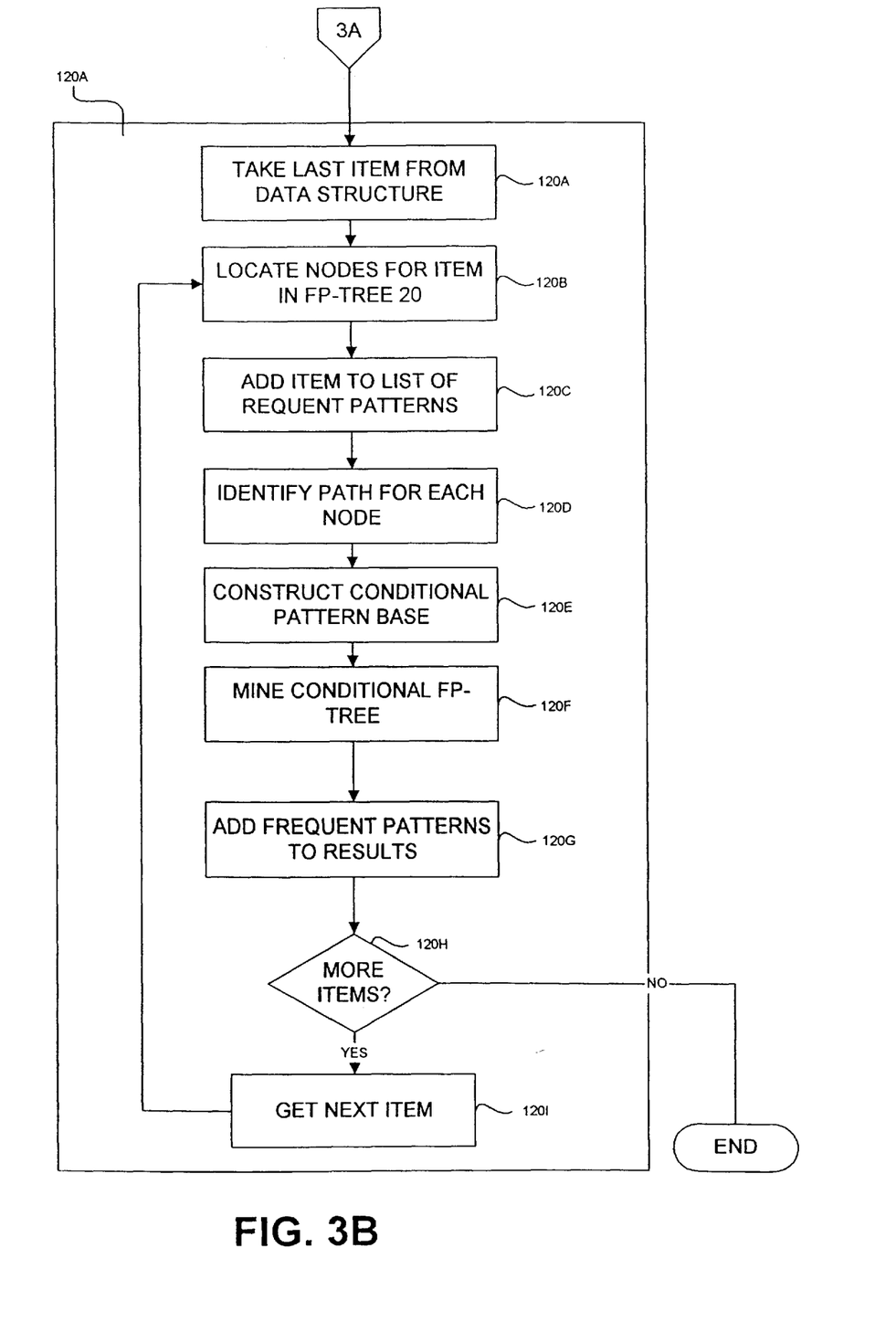
Figure 4:
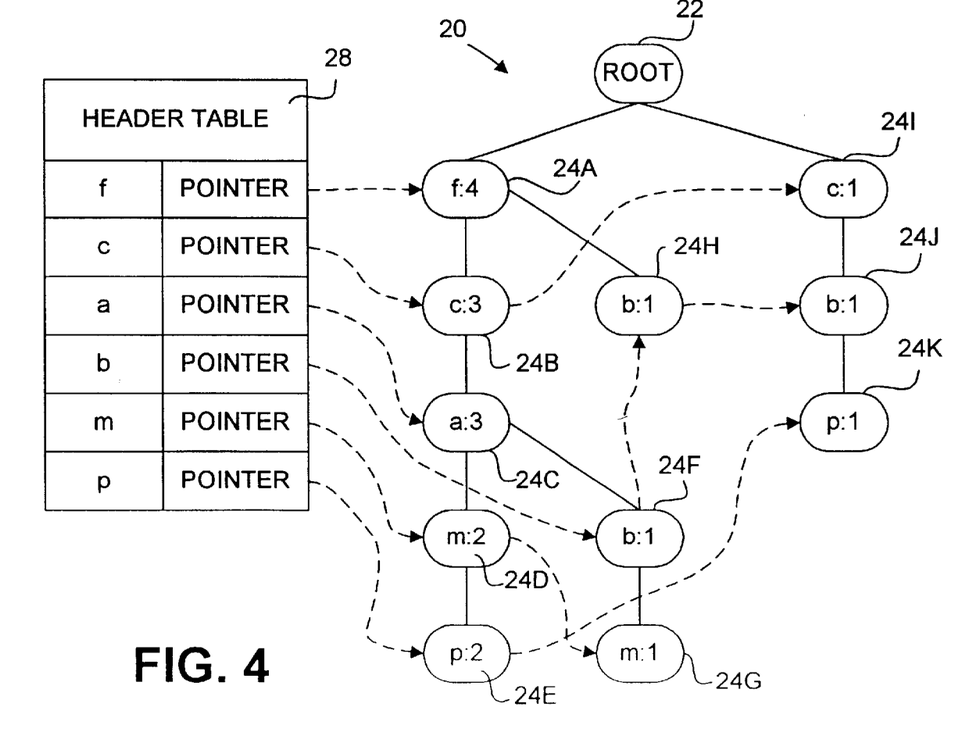
FIG. 4 an example of a very small frequent pattern tree according to this invention.

Flow diagrams illustrating a method 100 according to the invention are shown in FIGS. 2, 3A and 3B. Method 100 begins by constructing an FP-tree 20 corresponding to a database 10 (step 110). An example of an extremely small FP-tree 20 which corresponds to the data of Table I is shown in FIG. 4. FP-tree 20 has a root 22 and a plurality of nodes 24 linked to root 22. Each node 24 corresponds to a frequent item in database 10 and includes a counter 26.

As shown in FIG. 3A, step 110 begins by creating an ordered list of frequent items in database 10 (step 112). Step 112 begins by searching database 10 to obtain a list of the most frequently occurring items in database 10 (step 112A). Method 100 may use a user-specified threshold to determine whether an item is "frequent" or not. Step 112 assigns an order to the frequent items which are located in database 10 (step 112B). In preferred embodiments of the invention the frequent items are ordered in order of their frequency in database 10. The resulting list includes the items which occur more than a threshold number of times in the database 10. For the example database of Table I, the items which occur 3 or more times are as follows:
(f:4)(c:4)(a:3)(b:3)(m:3)(p:3). These items are ordered in the order {f,c,a,b,m,p}. The number after each item is the number of times that the item occurs in database 10. This number is also known as the "support" of the item in the database 10.

Figure 5A:
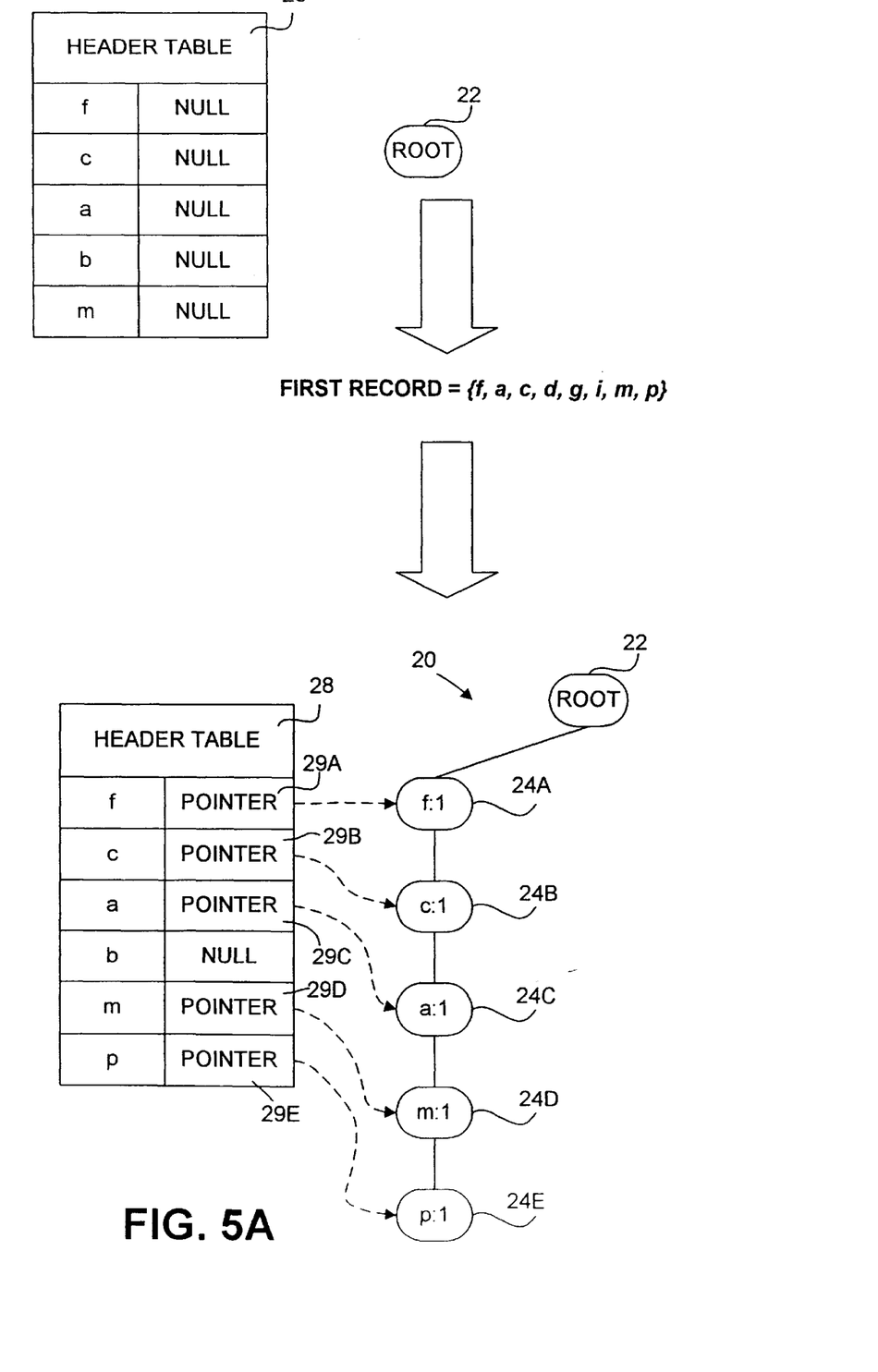
FIGS. 5A, 5B, 5C, 5D and 5E are diagrams illustrating stages in the construction of an example FP-tree according to the invention.
Figure 5B:
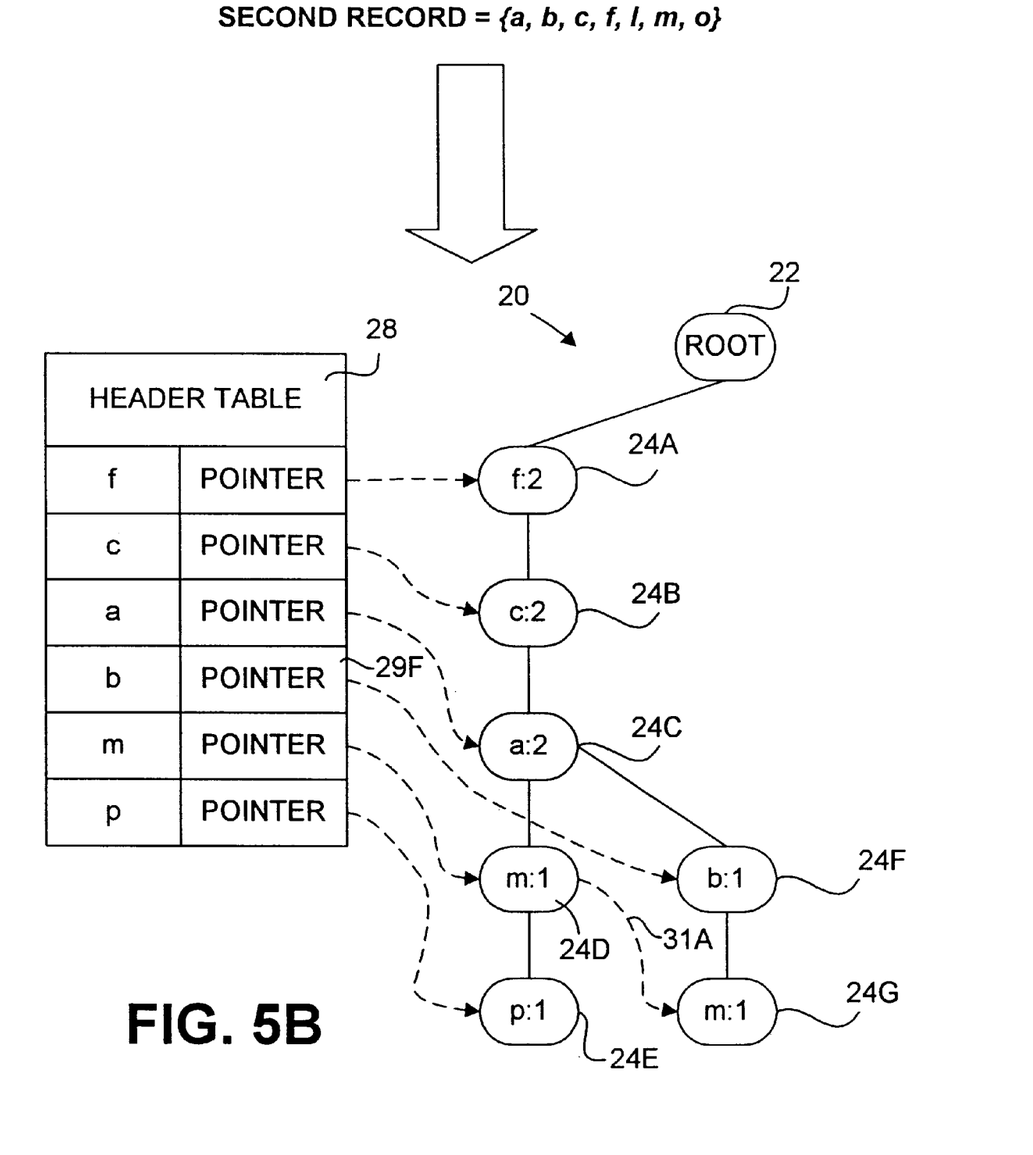
Figure 5C:
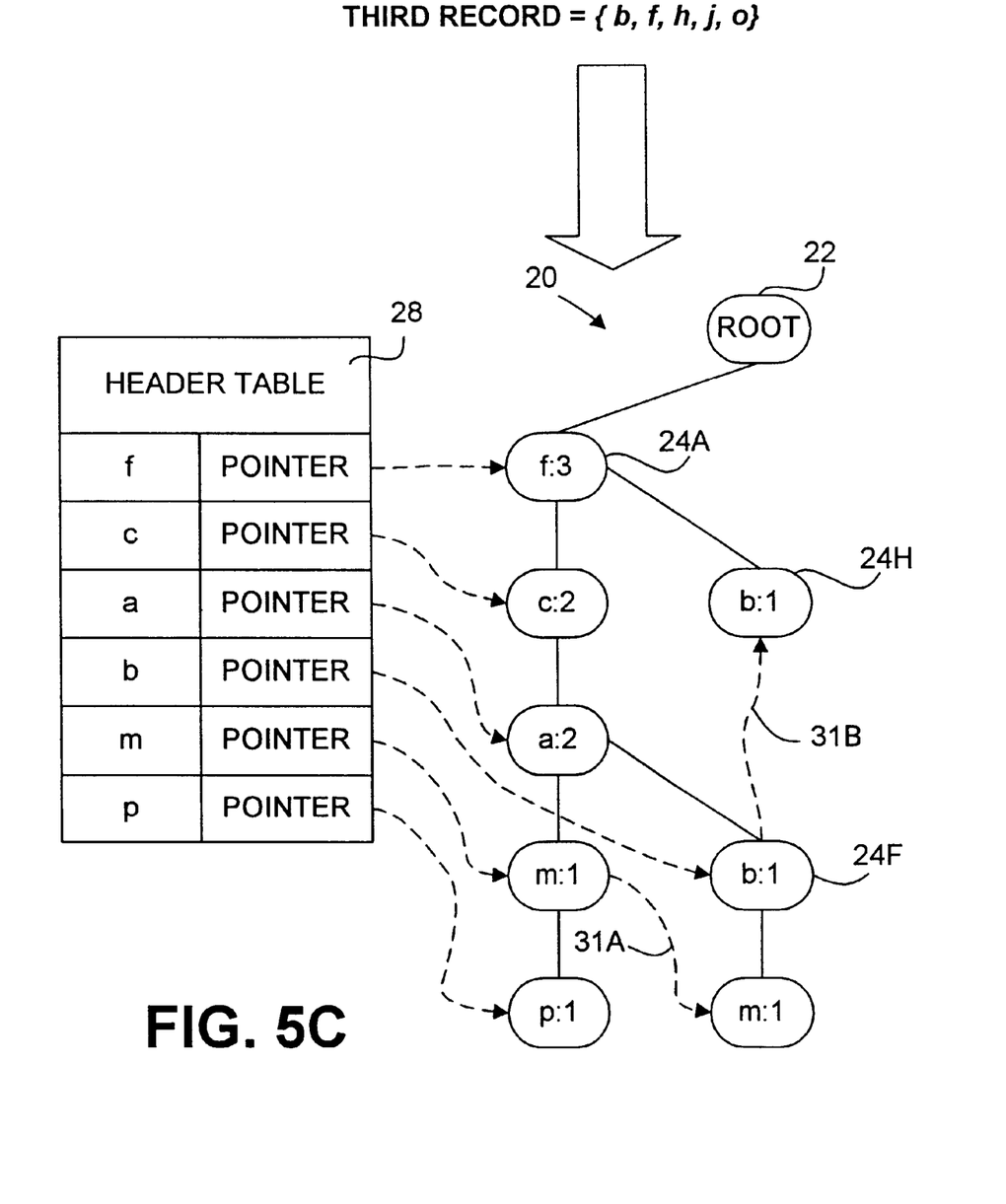
Figure 5D:
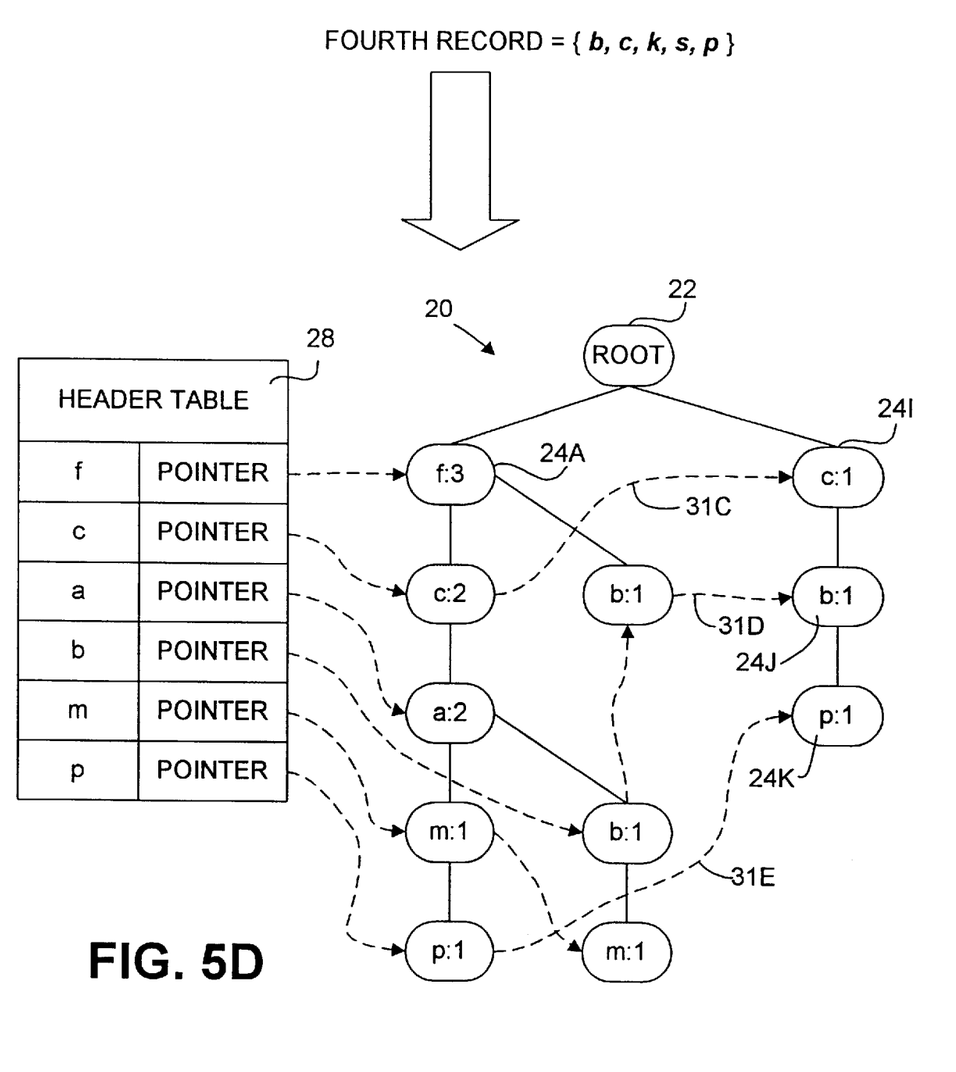
Figure 5E:
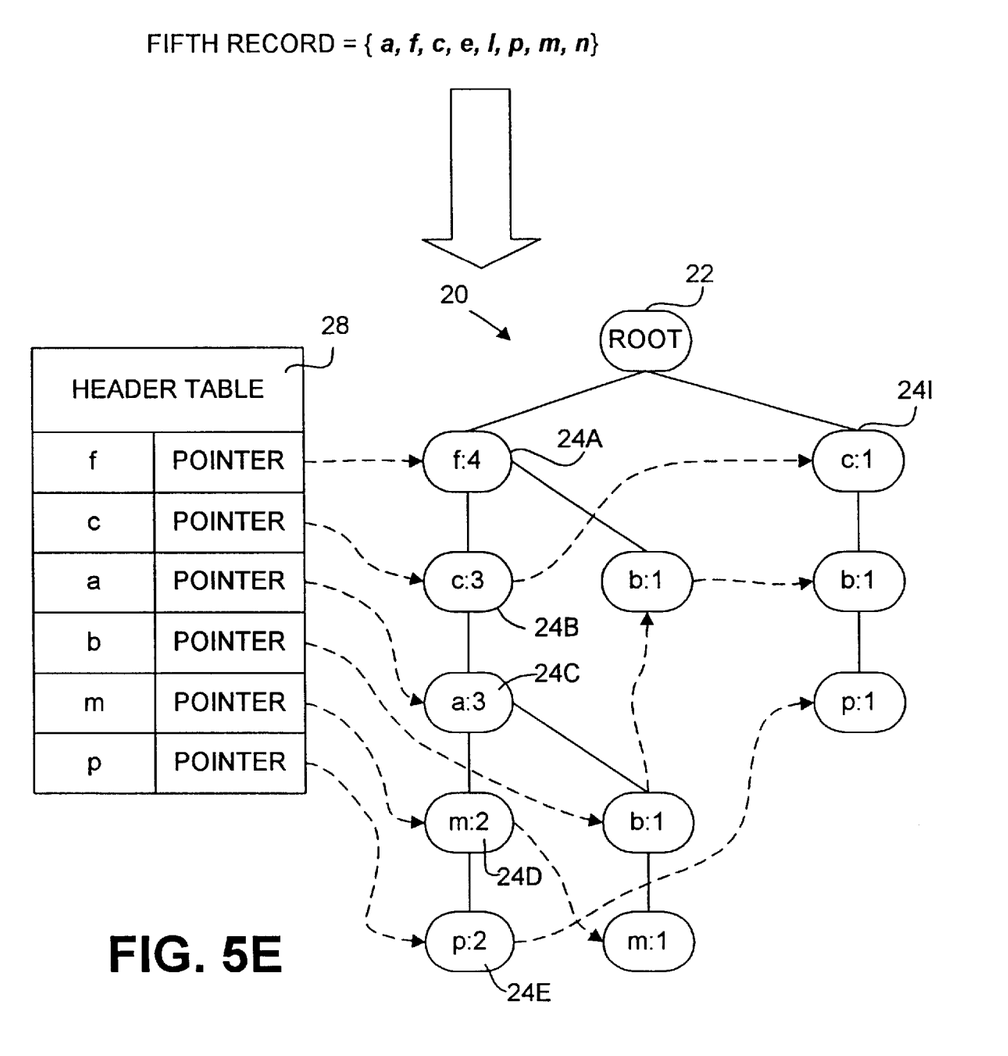

Step 110 continues by adding information about any frequent items represented each record of database 10 to FP-tree 20 (step 114). The state of FP-tree 20 at the beginning of step 114, is shown in FIG. 5A. Step 114 begins by taking a record from database 10 (step 114A) and creating an ordered list of any frequent items occurring in that record (in the same order determined by step 112B) (step 114B). Step 114 then takes the first item in the ordered list (step 114C) and, beginning at root 22, determines whether there are any nodes 24 directly linked to root 22 which correspond to that first item (step 114D). If not then step 110 adds such a node 24 to FP-tree 20 and sets its counter 26 to have a value of "1" (step 114E). In FIGS. 5A through 5E, nodes 24A through 24K are added, in order, to FP-tree 20.

Preferably FP-tree 20 includes a header data structure 28 which includes a record for each of the frequent items in database 10. Each record in header structure 28 includes a pointer 29 to the first node 24 added to FP-tree 20 which corresponds to that frequent item. Each node 24 also includes a pointer 31 which can point to another node 24 which relates to the same item. Step 114E includes updating pointers 29 and 31 as necessary.

As FP-tree 20 is constructed, pointers 29 and 31 are assigned. FIGS. 5A through 5E illustrate the order in which pointers 29 and 31 are assigned during the construction of a simple FP-tree 20. As new nodes are added to FP-tree 20, pointers 31 are added so that all of the nodes 24 which relate to a selected frequent item can be located by traversing FP-tree 20 beginning at the node indicated by the appropriate pointer 29 in header data structure 28. A node 24 which is the last node 24 for a particular item can have the value of its pointer 31 set to NULL or some other value which indicates that the node 24 is the last node which is associated with the particular item.

If step 114D determines that there is already a node 24 directly linked to root 22 which correspond to the first item in the ordered list for the record then the method increments the counter 26 in that node (step 114F). This is illustrated, for example, in FIG. 5E in which the addition of the fifth record does not require the addition of any nodes.

Step 114 then takes the next item from the record (step 114G) and repeats the steps of adding a node or incrementing a counter in an existing node of FP-tree 20 for the next item, as indicated by arrow 114H. When it is determined that there are no more items for the current record (step 114I) then step 114 takes the next record (step 114J) and proceeds to incorporate the frequent items from that record into FP-tree 20 as indicated by arrow 114K. When all of the records in database 10 have been processed, as determined at block 114L, then method 100 proceeds to step 120 (FIGS. 2, 3B) to identify the frequent patterns in database 10 with the use of FP-tree 20.

Step 120 collects frequent patterns involving an item by traversing FP-tree 20 beginning at the pointer 29 in header data structure 28 which corresponds to that item. Preferably this is done by selecting (step 120A) the item at the bottom of the header data structure 28 (i.e. with the last in order of the frequent items ordered in step 112B). In the preferred embodiment this corresponds to the frequent item having the smallest support in database 10.

Step 120 identifies nodes 24 which correspond to the frequent item in question (step 120B). In the example of FIG. 4, patterns involving the item p would be located first because p, with support of 3 in the database of Table I, is at the foot of data structure 28. The item p corresponds to nodes 24E and 24K. Each item must be frequent. Step 120 adds the item itself to a list of frequent patterns (step 120C) (in the case of the example, step 120 adds p:3 (3 is the total of the counters of the detected nodes and is the support for the pattern p) to a list of frequent patterns.

Step 120 then identifies a path to which each of the nodes detected in step 120B belongs (step 120D). A prefix path for a node is the set of nodes in FP-tree 20 beginning at root 22 and ending at the node in question. In the example, the path for node 24E is <(f:4, c:3, a:3, m:2, p:2)> and the path for node 24K is <(c:1, b:1, p:1)>. These paths contain information about what items occur together with p in the data of Table I. For example, these paths indicate that the pattern "(f, c, a, m, p)" occurs twice in the database of Table I. Notice that no pattern in the path of node 24E which involves the item p can occur more than twice since the count for p in node 24E is equal to 2.

Step 120 continues by constructing a "prefix path" from each of the paths detected in step 120B (step 120E). The prefix path may be constructed by taking the items and counts for each node between the node 24 in question and root 22 and replacing the count with the count for the node in question. In the example, the prefix path for node 24E is <(f:2, c:2, a:2, m:2)> and the prefix path for node 24K is <(c:1, b:1)>. The set of all prefix paths for an item may be called the "conditional pattern base" for the item.

Step 120 then constructs a new FP-tree (which may be called a "conditional FP-tree") for the conditional pattern base identified by step 120E (step 120F). In the case of item d, the tree contains only the single node (c:3) which corresponds to the frequent pattern (cp:3). Step 120 adds any frequent patterns found from the conditional FP-tree to its list of frequent patterns (step 120G). If there are any further items to process in data structure 28 (as determined at block 120H) then step 120 selects the next item (step 120I) and repeats steps 120B through 120H for the next item. Otherwise method 120 terminates.

Figure 6:
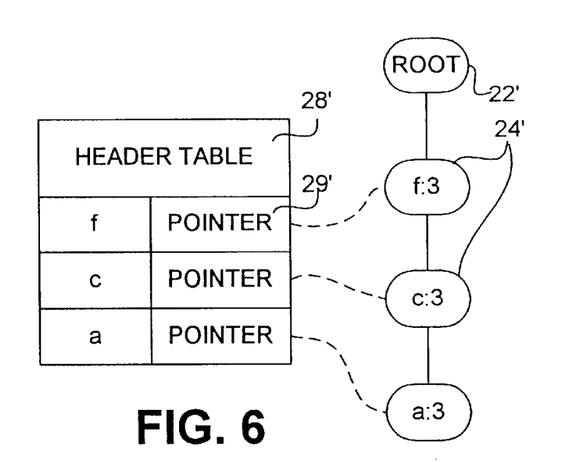
FIG. 6 is an example conditional FP-tree created in an example embodiment of the invention.

For the example data of Table I, item m is processed next after item p. Step 120C adds the frequent item (m:3) to the list of frequent patterns. Step 120E generates the conditional pattern base {<(f:2, c:2, a:2)>, f:1, c:1, a:1, b:1)>}. Step 120F generates the conditional FP-tree 20' of FIG. 6 by applying method 110 treating the conditional pattern base as a database and each prefix path as a record. This yields the frequent items (f:3 c:3 a:3). FIG. 6A uses the same reference numerals as are used in FIG. 4 with a "prime" symbol to indicate that the FP-tree 20' of FIG. 6A is separate from FP-tree 20 of FIG. 4.

Step 120E mines conditional FP-tree 20' for frequent patterns which involve m. Even though Table I includes records in which items m and p occur together there is no need to consider p since all frequent patterns involving p have been detected in the previous iteration. It can be seen from FIG. 6A that mining conditional FP-tree 20' involves mining the three items a, c and f which occur in data structure 28 in sequence. We can use the terminology:

mine(<path>|pattern)

to denote mining the path specified by path for frequent items to be concatenated to the pattern specified by pattern to yield a frequent pattern. The item a is present in combination with m and yields the frequent pattern (am:3) and a call to mine(<f:3, c:3>|am). Mining item c produces the frequent pattern (cm:3) and a call to mine(<f:3>|cm). Mining item f simply produces the frequent pattern (fm:3). The call to mine(<f:3, c:3>|am) yields the frequent patterns (fam:3) and (cam:3) and a call to mine(<f:3>|cam. The call to mine(f:3>|cam yields the frequent pattern (fcam:3). Similarly the call to mine(<f:3>|cm) yields the frequent pattern (fcm:3). Therefore, the whole set of frequent patterns involving item m is {(m:3), (am:3), (cm:3), (fm:3), (cam:3), (fam:3), (fcam:3), and (fcm:3) } These frequent patterns are added to the results list. It can be appreciated from this example that all of the patterns in a single-path conditional FP-tree 20' can be mined by outputting all of the combinations of items in the path.

In the next iteration, item b is taken. This yields the frequent pattern (b:3). Nodes 24F, 24H, and 24J yield the conditional pattern base {(f:1, c:1, a:1)(f:1)(c:1)}. This conditional pattern base generates no frequent item (in this example, a frequent item must occur 3 or more times). Therefore, there are no other frequent patterns involving item b.

Step 120 continues by taking item a. This yields the frequent pattern (a:3) and the sub-conditional pattern base {(f:3, c:3)}. Since this is a single-path conditional FP-tree, step 120 may proceed as described above in processing item m or may simply output all combinations of the items in the sub-conditional pattern base. Preferably step 120 recognizes single-path conditional pattern bases and automatically outputs all combinations of the items in the single-path conditional pattern bases instead of recursively determining the frequent patterns represented in that conditional pattern base as described above. This yields the frequent patterns {(fa:3) (ca:3) (fca:3)}.

Processing item c yields the frequent pattern (c:4) and the conditional pattern base {(f:3)}. This yields the additional frequent pattern (fc:3). Finally, processing item f yields only the frequent pattern (f:4).

A method according to the invention for collecting frequent patterns from an FP-tree 20 can be expressed in the following pseudo-code:
Input: An FP-tree 20 based upon data from a database 10 and a minimum support threshold $\xi$.
Output: A complete list of patterns which occur in the data with a frequency greater or equal to $\xi$.
Procedure FP-Growth (Tree, $\alpha$)

```
{
    If Tree contains the single path P then:
        for each combination (denoted as β) of the nodes in path P
        do
            generate pattern β ∪ α with support=minimum
            support of nodes in β
        end for
    else
        for each item a_i in header data structure 28
        do {
            generate pattern β=a_i ∪ α with support=a_i
            support;
            construct β's conditional pattern base and β's
            conditional FP-tree denoted as Tree_β;
            if Tree_β≠0
                call FP-growth(Tree_β, β);
            end if}
        end for
}
```

The method can be expressed in broader terms as follows:
For each item, construct its conditional pattern-base, and then its conditional FP-tree;
Repeat the process on each newly created conditional FP-tree until the resulting FP-tree is empty, or it contains only one path;
If the FP-tree contains only a single path, generate all of the combinations of its sub-paths, each of which is a frequent pattern;
At some point after creating each FP-tree collect (and preferably count) the frequent itemsets from each FP-tree.

Mining frequent data patterns using an FP-tree can be done most quickly if the entire FP-tree is resident in a rapidly accessible memory, such as the RAM memory in a computer. It may not be practical, however, to provide enough RAM memory to accommodate an FP-tree for a very large database. In this case, various approaches are possible. One approach is to partition the database in question into a set of partitioned databases in such a way that FP-trees for each of the partitioned databases is small enough to be efficiently received in memory. Partitioning may be done by projecting the original database into a set of smaller databases. The projections are based on the current set of frequent patterns. Each projected database can then be mined to find its frequent patterns.

Figure 7:
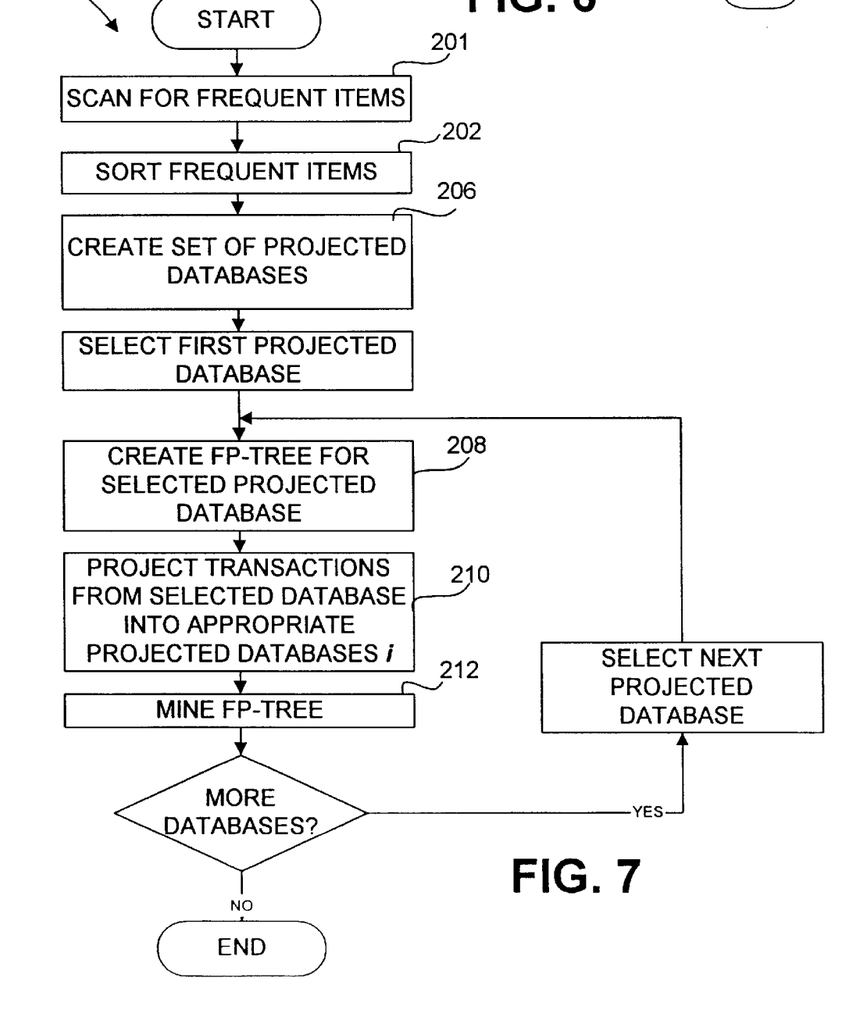
FIG. 7 is a flow chart illustrating an embodiment of the invention which uses projected databases to reduce the size of FP-trees required for practising the invention; and, FIG. 8 is a graph illustrating a relationship between run time and support threshold for a method according to this invention and for an apriori-like method.

Partitioning a database may be done, for example, according to the method 200 of FIG. 7. Method 200 scans the database to find the set of frequent items in the database (step 201) and sorts the frequent items in order of descending frequency into a frequent items list L (step 202). Method 200 then scans the database again and projects the set of frequent items into a set of projected databases (step 206). This is done by taking each transaction in the original database in turn and projecting the set of frequent items, except for an item i of each transaction T, into an i-projected database (step 206). In step 206, for each transaction T, i is selected to be in T such that there is no other item in T which is ordered after i in L. This ensures that each transaction is projected to at most one projected database and the total size of the projected databases is smaller than the size of the original database.

As an example of the operation of step 206, consider the case where the list L for an original database contains the frequent items a, b, c, d, e and f, in that order. All of the transactions T in the original database can be divided into six projected databases, each of which contains a subset of the transactions from the original database as shown in Table II.

TABLE II

Example Projected Databases

| Subset No. | Contents |
|---|---|
| 1 | Transactions containing item f |
| 2 | Transactions containing item e but not item f |
| 3 | Transactions containing item d but not any items e or f |
| 4 | Transactions containing item c but no items d, e or f |
| 5 | Transactions containing item b but no items c, d, e or f |
| 8 | Transactions in which the only frequent item is item a |

The complete set of patterns containing a specific item, i, but no items following i in list L can be found in the appropriate i-projected database.

Method 200 continues by scanning the set of projected databases in the reverse order of L. For each projected database method 200 constructs an FP-tree (step 208) and projects entries from the currently projected database onto other ones of the set of projected databases (step 210). Where the currently selected database is the j-projected database then, for each transaction $T_j$, step 210 projects the set of items (except for items i and j) into the i-projected database as a transaction if item i is in $T_j$ and there is not any other item in $T_j$ ordered after i in L. The FP-trees can then be mined to produce frequent patterns (step 212). Step 212 can be performed for any one of the FP-trees at any time after the FP-tree has been constructed.

Method 200 constructs and mines an FP-tree for each frequent item. Each FP-tree is much smaller than the entire database. If a projected database is still too big to have its FP-tree fit in memory, the construction of its FP-tree can be postponed further.

Those skilled in the art will understand that the methods and systems described above have significant advantages over the prior art apriori methods for frequent pattern mining. The FP-tree data structure is often much smaller than a corresponding database. When nodes are entered into an FP-tree in a frequency-descending order, as is preferred, frequent items and itemsets are likely to share nodes in the FP-tree. Using an FP tree structure can therefore save significant amounts of data storage space in addition to making it possible to mine frequent patterns as described above.

The preferred embodiments of the methods described above permit the complete set of frequent patterns to be mined. Those skilled in the art will appreciate that the FP-tree never breaks a long pattern of any transaction and preserves complete information for frequent pattern mining.

The inventors have created specific implementations of this invention in the form of C++ computer programs running on a 450 MHz. Pentium™ processor equipped personal computer with 128 Megabytes of main memory running the Microsoft™ Windows NT operating system. It was found that the runtime of software implementing the FP-tree based methods of this invention:

scaled much better with decreasing support threshold than did the runtime of apriori-based methods; and, increased more slowly with the number of transactions than did the runtime of apriori-based methods.

FIG. 8 is a plot of run time as a function of support threshold for an FP-tree based implementation of this invention and a comparable apriori method. It can be seen that the run time of the FP-tree based system increases much more slowly with decreasing support threshold than does the apriori system.

Preferred implementations of the invention comprise computers running software instructions which cause the computers to execute a method of the invention. The invention may also be provided in the form of a program product. The program product may comprise any medium which carries a set of computer-readable signals containing to instructions which, when run by a computer, cause the computer to execute a method of the invention. The program product may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links.

As will be apparent to those skilled in the art in the light of the foregoing disclosure, many alterations and modifications are possible in the practice of this invention without departing from the spirit or scope thereof. For example:

While it is not preferred, an FP-tree according to the invention may be used to generate and check candidate frequent patterns in a conventional apriori-like manner;

The FP-tree may be organized in physical memory in many different ways;

Instead of providing a link in each node 24 pointing to the next node 24 which corresponds to the same item, header structure 28 could comprise pointers to every node 24 in FP-tree 20 which corresponds to a particular frequent item.

The term "header structure" is not meant to restrict the location of the header structure. The header structure 28 may be stored in a data store in a location separate from the rest of an FP-tree.

Unless otherwise required by context, the term database in this specification does not require any specific structure but merely signifies an organized collection of information accessible to a computer.

Accordingly, the scope of the invention is to be construed in accordance with the substance defined by the following claims.

What is claimed is:

1. A method for identifying patterns from a database of records, each record having a plurality of items, the method comprising:

constructing an FP-tree for the database; and, mining the FP-tree to obtain frequent patterns wherein constructing the FP-tree comprises:

scanning the database to obtain an ordered list of frequent items in the database;

for each record in the database:

creating a list of any frequent items occurring in that record in the same order as the frequent items occur in the ordered list;

setting a root node of the FP-tree as a current node; and, for each item in the list of any frequent items, determining whether there is a nods directly linked to the current node which corresponds to the item, if so, incrementing a counter for the node and setting the node as the current node; and, if not, creating a node corresponding to the item and linked to the current node and setting the created node as the current node.

2. The method of claim 1 wherein the frequent items in the ordered list are ordered in order of their frequency in the database.

3. The method of claim 1 wherein the FP-tree comprises a header data structure which includes a record for each of the frequent items in the database.

4. The method of claim 3 comprising, adding a pointer in the header structure to the first node added to the PP-tree corresponding to each of the frequent items.

5. The method of claim 4 wherein creating a node corresponding to the item comprises setting a pointer to the created node in a previously created node corresponding to the same item.

6. The method of claim 5 wherein mining the FP-tree to obtain frequent patterns comprises:
   a) for each frequent item constructing a conditional pattern-base, and constructing a conditional FP-tree from the conditional pattern-base;
   b) recursively constructing a conditional pattern-base, and constructing a conditional FP-tree from the conditional pattern-base on each newly created conditional FP-tree until the resulting FP-tree is empty; and,
   c) after creating each FP-tree, collecting frequent itemsets from the FP-tree.

7. The method of claim 6 comprising, determining whether a conditional FP-tree contains only one path and, of so, generating all combinations of sub-paths of the FP-tree and recording each sub-paths as a frequent pattern.

8. The method of claim 7 comprising counting the occurrences of each frequent itemset.

9. The method of claim 6 wherein collecting frequent itemsets from each FP-tree comprises:
   if the FP-tree contains a single path, P, then, for each combination, $\beta$, of the nodes in path P generating the pattern $\beta \cup \alpha$.

10. The method of claim 9 comprising assigning to the pattern a support equal to the minimum support of the nodes in path P.

11. The method of claim 9 comprising, for each item $a_i$ in the header data structure generating a pattern $\beta = a_i \cup \alpha$;
   constructing a conditional pattern base for $\beta$ and constructing a conditional FP-tree based on the conditional pattern base; and,
   if the conditional FP-tree is not empty, collecting frequent itemsets from the conditional FP-tree.

12. A method for identifying patterns from a database of records, each record having a plurality of items, the method comprising:
   constructing an FP-tree for the database; and,
   mining the FP-tree to obtain frequent patterns wherein mining the FP-tree to obtain frequent patterns comprises:
   a) for each frequent item constructing a conditional pattern-base, and constructing a conditional FP-tree from the conditional pattern-base;
   b) recursively constructing a conditional pattern-base, and constructing a conditional FP-tree from the conditional pattern-base on each newly created conditional FP-tree until the resulting FP-tree is empty; and,
   c) after creating each FP-tree, collecting frequent itemsets from the FP-tree.

13. The method of claim 12 comprising, determining whether a conditional FP-tree contains only one path and, of so, generating all combinations of sub-paths of the FP-tree and recording each sub-paths as a frequent pattern.

14. The method of claim 13 comprising counting the occurrences of each frequent itemset.

15. The method of claim 12 wherein collecting frequent itemsets from each FP-tree comprises:
   if the FP-tree contains a single path, P, then, for each combination, $\beta$, of the nodes in path P generating the pattern $\beta \cup \alpha$.

16. The method of claim 15 comprising assigning to the pattern a support equal to the minimum support of the nodes in path P.

17. The method of claim 15 comprising, for each item $a_i$ in the header data structure generating a pattern $\beta = a_i \cup \alpha$;
   constructing a conditional pattern base for $\beta$ and constructing a conditional FP-tree based on the conditional pattern base; and,
   if the conditional FP-tree is not empty, collecting frequent itemsets from the conditional FP-tree.

18. A method for identifying patterns from a database of records, each record having a plurality of items, the method comprising providing an FP-tree corresponding to the database and mining the FP-tree to obtain frequent patterns by:
   a) for each frequent item constructing a conditional pattern-base, and constructing a conditional FP-tree from the conditional pattern-base;
   b) recursively constructing a conditional pattern-base, and constructing a conditional FP-tree from the conditional pattern-base on each newly created conditional FP-tree until the resulting FP-tree is empty; and,
   c) after creating each FP-tree, collecting frequent itemsets from the FP-tree.

19. The method of claim 18 comprising, determining whether a conditional FP-tree contains only one path and, of so, generating all combinations of sub-paths of the FP-tree and recording each sub-paths as a frequent pattern.

20. The method of claim 19 comprising counting the occurrences of each frequent itemset.

21. The method of claim 18 wherein collecting frequent itemsets from each FP-tree comprises:
   if the FP-tree contains a single path, P, then, for each combination, $\beta$, of the nodes in path P generating the pattern $\beta \cup \alpha$.

22. The method of claim 21 comprising assigning to the pattern a support equal to the minimum support of the nodes in path P.

23. The method of claim 21 comprising, for each item $a_i$ in the header data structure generating a pattern $\beta = a_i \cup \alpha$;
   constructing a conditional pattern base for $\beta$ and constructing a conditional FP-tree based on the conditional pattern base; and,
   if the conditional FP-tree is not empty, collecting frequent itemsets from the conditional FP-tree.

24. A method for constructing an FP-tree corresponding to a database and containing information useful for identifying frequent patterns in the database, the method comprising:
   scanning the database to obtain an ordered list of frequent items in the database;
   for each record in the database;
   creating a list of any frequent items occurring in that record in the same order as the frequent items occur in the ordered list;
   setting a root node of the FP-tree as a current node; and, for each item in the list of any frequent items,
  determining whether there is a node directly linked to the current node which corresponds to the item,
  if so, incrementing a counter for the node and setting the node as the current node; and,
  if not, creating a node corresponding to the item and linked to the current node and setting the created node as the current node.

25. The method of claim 24 wherein the frequent items in the ordered list are ordered in order of their frequency in the database.

26. The method of claim 24 wherein the FP-tree comprises a header data structure and the method comprises writing a record for each of the frequent items in the database in the header structure.

27. The method of claim 26 comprising, adding a pointer in the header structure to the first node added to the FP-tree corresponding to each of the frequent items.

28. The method of claim 27 wherein creating a node corresponding to the item comprises setting a pointer to the created node in a previously created node corresponding to the same item.

29. An FP-tree data structure for use in mining frequent patterns from a database containing a plurality of records, the FP-tree data structure resident in a storage device accessible to a computer and comprising
  a plurality of linked nodes and a header structure;
  the header structure comprising an ordered list of frequent items from a database and a pointer to at least one node associated with each of the frequent items;
  each of the linked nodes associated with one of the frequent items of the header structure, the nodes linked to form a plurality of paths, the nodes on each of the paths corresponding to frequent items present in a record of the database;
  wherein nodes associated with a selected one of the frequent items of the header structure are accessible by traversing the nodes beginning at the pointer in the header structure corresponding to the selected one of the frequent items, each of the nodes comprises a pointer capable of identifying another one of the nodes associated with the same one of the frequent items and traversing the nodes comprises sequentially following the pointers in the nodes discovered by beginning at the pointer in the header structure corresponding to the selected one of the frequent items.

30. The FP-tree data structure of claim 29 wherein each of the nodes comprises a counter.

31. The FP-tree data structure of claim 30 wherein the FP-tree data structure is completely resident in RAM memory in a computer.

32. Apparatus for mining frequent patterns from information in a database comprising a plurality of records, the apparatus comprising:
  a) a computer processor;
  b) a database having records accessible to the computer processor;
  c) a program store accessible to the computer processor;
  d) a data store accessible to the computer processor;
  e) software instructions recorded in the program store, the software instructions, executable by the computer processor, the software instructions, when executed, causing the computer processor to:
    i) scan the database to obtain a list of frequent items in the database;
    ii) create an ordered list of the frequent items ordered in order of frequency in the database; and,
    iii) based on the ordered list of the frequent items and information from the database, create an FP-tree data structure corresponding to the database in the data store
  wherein a set of the software instructions which cause the processor to create an FP-tree data structure in the data store cause the processor to retrieve each record in the database;
  select any frequent items occurring in that record in the same order as the frequent items occur in the ordered list;
  set a root node of the FP-tree as a current node; and,
  for each selected frequent item,
    determine whether the FP-tree includes a node directly linked to the current node which corresponds to the item,
    if so, increment a counter for the node and set the node as the current node; and,
    if not, create a new node corresponding to the item and linked to the current node and setting the new node as the current node.

33. A program product comprising a medium carrying a set of computer-readable signals containing computer-executable instructions which, when run by a computer, cause the computer to execute the method of claim 1.

34. A program product comprising a medium carrying a set of computer-readable signals containing computer-executable instructions which, when run by a computer, cause the computer to scan a database to obtain an ordered list of frequent items in the database; and, to create an FP-tree in a storage medium accessible to the computer by:
  for each record in the database:
    creating a list of any frequent items occurring in that record in the same order as the frequent items occur in the ordered list;
    setting a root node of the FP-tree as a current node; and,
    for each item in the list of any frequent items,
      determining whether there is a node directly linked to the current node which corresponds to the item,
      if so, incrementing a counter for the node and setting the node as the current node; and,
      if not, creating a node corresponding to the item and linked to the current node and setting the created node as the current node.

* * * * *